United States Patent [19]
Alvaro et al.

[11] Patent Number: 5,996,792
[45] Date of Patent: Dec. 7, 1999

[54] OPTICAL LENS TRAY

[75] Inventors: Philip Michael Alvaro, Pittsford; David Allen Dicesare, Rochester; Michael Donovan Dunn, Rochester; Timothy Floyd Spencer, Rochester, all of N.Y.

[73] Assignee: Eastman Kodak Company, Rochester, N.Y.

[21] Appl. No.: 08/899,347

[22] Filed: Jul. 23, 1997

[51] Int. Cl.⁶ .......................... B65D 85/48; A47B 37/00
[52] U.S. Cl. .................. 206/454; 206/445; 206/486; 211/41.14
[58] Field of Search ................ 206/5, 5.1, 445, 206/454, 456, 486, 564, 511, 316.1; 211/41.14

[56] References Cited

U.S. PATENT DOCUMENTS

| | | | |
|---|---|---|---|
| 1,274,557 | 8/1918 | Kandler | 206/5 |
| 1,647,922 | 11/1927 | Linder | 206/564 X |
| 2,139,150 | 12/1938 | Curtis et al. | 206/489 X |
| 2,346,792 | 4/1944 | Rush | 206/445 X |
| 3,437,423 | 4/1969 | Mondiadis | 206/511 |
| 3,889,815 | 6/1975 | Merle . | |
| 4,084,700 | 4/1978 | Dunchock . | |
| 4,479,988 | 10/1984 | Dawson | 428/34 |
| 4,494,667 | 1/1985 | Griffith | 206/564 X |
| 4,670,072 | 6/1987 | Pastor et al. | 428/63 |
| 4,796,756 | 1/1989 | Ott | 206/454 |
| 5,033,774 | 7/1991 | Benardelli | 206/0.82 X |
| 5,150,792 | 9/1992 | Munroe | 206/486 |
| 5,584,400 | 12/1996 | Feinbloom . | |

FOREIGN PATENT DOCUMENTS 8-122604   5/1996   Japan .

OTHER PUBLICATIONS

Abstract of Japanese publication JP 8122604–A, pp. 31 & 32/5699M96 May 1996.

NASA publication, Vacuum Technology and Space Simulation, D Santeler, D Holkeboer, D Jones, F Pagano. pp. 218–222 1966.

*Primary Examiner*—Bryon P. Gehman
*Attorney, Agent, or Firm*—Svetlana Z. Short

[57] ABSTRACT

A lens tray includes a support panel having an array of sockets. Each of the sockets has a first wall defining a first opening and a second wall defining a second opening, a retaining wall adjacent to the first wall and a flange having a first surface forming a lens seat. The first surface is located adjacent to the retaining wall. At least one of the openings has an inner aperture and an outer aperture. The outer aperture is greater in size than the inner aperture.

16 Claims, 9 Drawing Sheets

FIG. 1A
(PRIOR ART)

LENS ELEMENT

OPTICAL LENS TRAY

FIELD OF THE INVENTION

This invention relates to optical system manufacturing apparatus and methods and more particularly to lens trays and a method for their use.

BACKGROUND OF THE INVENTION

Automatic lens system assembly operations are known. They do not require a large number of human personnel assembling lens elements into a lens barrel. Thus, an automatic lens system assembly operation can provide significant cost savings when a large number of lens systems are being assembled. An automatic lens system assembly operation may use, for example, a robotic arm that picks up (by suction, claw or otherwise) lens elements from a lens holder (such as a lens tray), and assembles them into the lens barrel. In this type of assembly it is important and often critical to know a precise location and orientation of each lens element, so that the robotic arm can pick up the lens element from the lens tray. If a lens element shifts and changes its position on the lens tray, and if the lens element is being picked up by suction, the amount of suction may not be enough to successfully pick up the lens element. Similarly, if the claw of the robotic arm can not successfully grab the lens element, the robotic arm may not be able to successfully remove the lens element from the lens tray.

It is known that the performance of a lens system may be improved if one or more lens elements in a lens system have coated surfaces. There are many lens coating methods. All of them require that lens elements be held in place during a coating operation. The lens elements are usually: (1) brought into a coating laboratory in a lens tray (such as those described below), (2) taken out of the lens tray, (3) loaded into a lens coating tray, (4) coated with a required coating material, (5) taken out of the lens coating tray, (6) loaded back into the lens tray and transported into an assembly area. At this point the lens elements may be taken out from the lens tray and loaded into a special tray that holds lens elements in a precise predetermined location for their subsequent use in the automatic assembly.

Figure 1A:
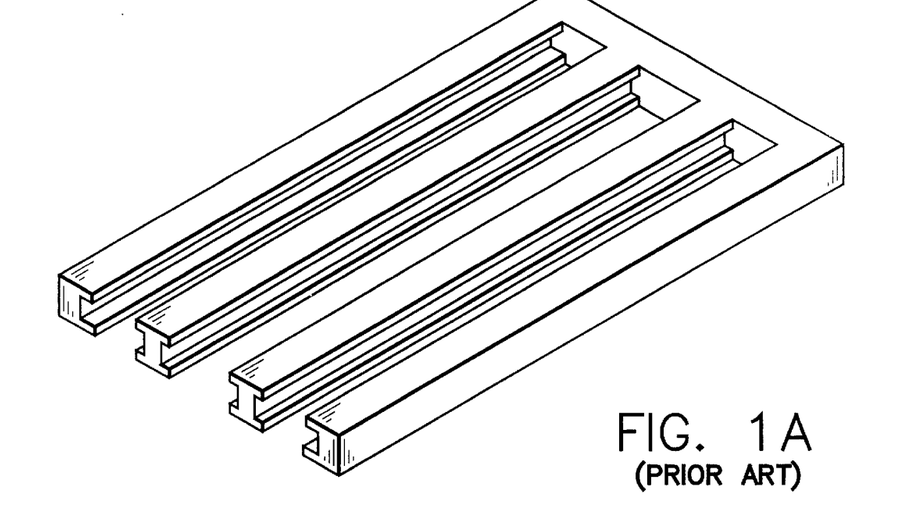
FIGS. 1A–1D illustrate a prior art lens tray construction.
Figure 1B:
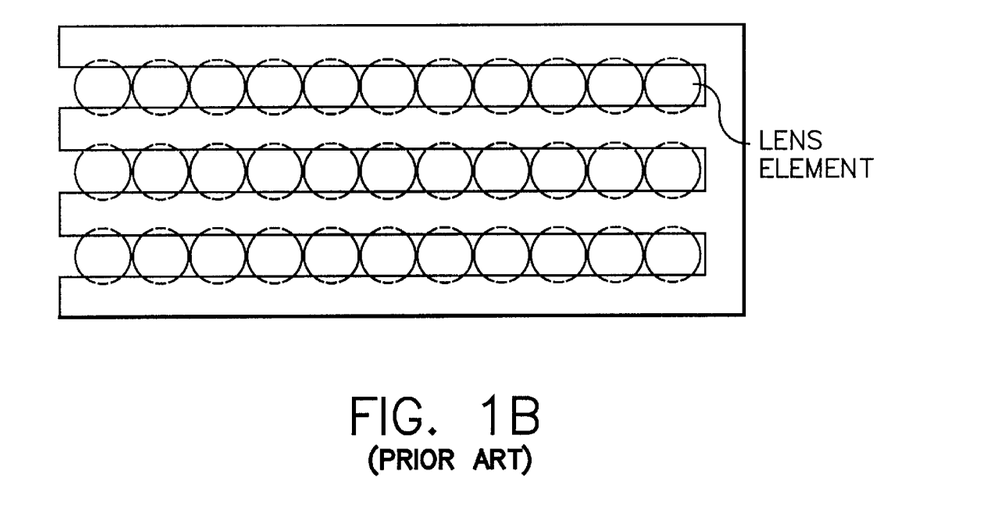

As stated above, lens trays for holding lens elements during transportation and storage are known. For example, steel lens trays are used that have a plurality of long, narrow grooves machined into them. Each of the grooves can hold a plurality of lens elements adjacent to one another (see FIGS. 1A, 1B). The lens elements are placed into these lens trays by holding the lens trays in either a vertical position or in a tilted position with the openside pointing upwards. If needed, the lens elements can be transported to a coating lab where the lens trays are placed in a horizontal position. The lens elements may be coated while still in the lens trays. Afterwards, the lens trays are shipped to the assembly area. The lens elements are removed from the lens tray by holding the lens tray in a tilted position with the open side pointing downwards, so that the lens element can slide out of the lens tray. A plurality of chutes then guide the lens elements towards the lens barrels into which they are assembled. The surfaces of the grooves are machined, and the lens elements do not slide out of the lens trays at a constant speed. This causes bunching of the lens element and clogging of lens chutes, interfering with the efficient automatic lens assembly. In addition, steel lens trays are heavy and are expensive to manufacture. When the lens trays of this configuration are injection molded, the grooves assume a bow like shape and the lens elements again do not slide out at a constant speed and tend to bunch together and, in addition, do not consistently hold the lens elements in.

Figure 1C:
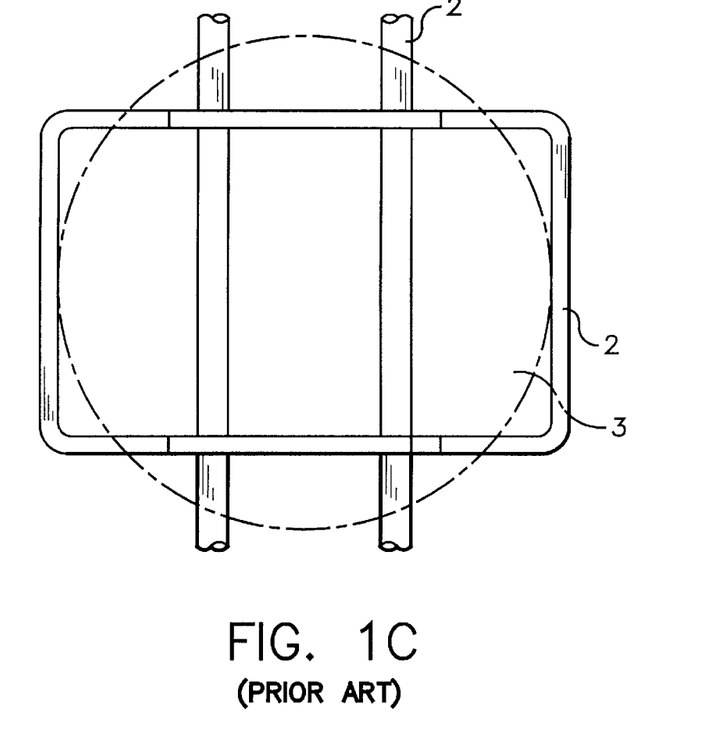
Figure 1D:
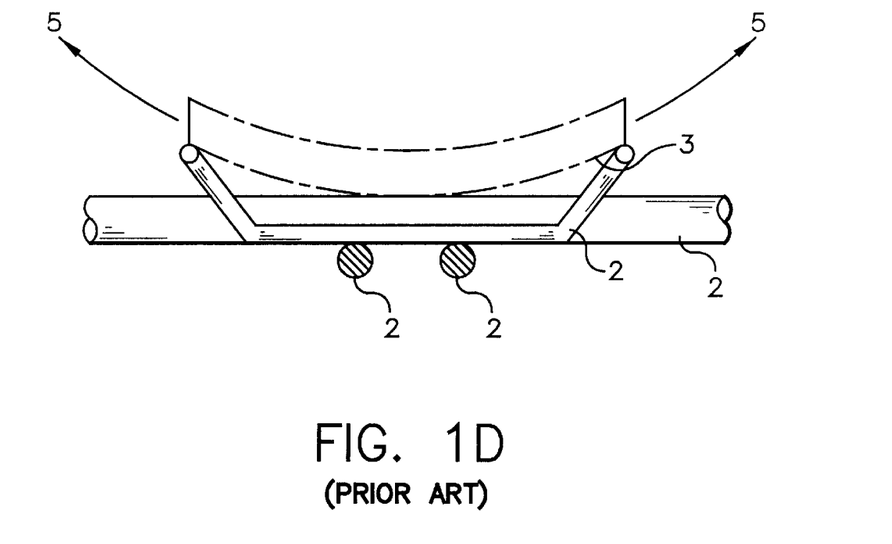

U.S. Pat. No. 4,494,667 discloses a wire rack lens tray that keeps lens elements from contacting with foreign surfaces that may scratch an optical surface of a lens element. These trays can be stacked on top of one another for efficient storage. However, the disclosed trays are not suitable for holding lens elements during a surface coating operation (such as vapor deposition) because the wire support structure 2 of the lens tray covers parts of lens elements' optical surfaces 3 (see FIG. 1C). Thus the lens elements would have to be taken out of the disclosed tray and put into another support structure during the coating operation. After the lens elements are coated they can be placed back into the wire rack lens tray. Finally, the disclosed lens trays are not suitable for use in an automatic lens assembly that requires the exact knowledge of lens elements' center coordinates. This is because the lens elements supported by this lens tray are supported only on one side (i.e., back side as shown in FIG. 1D), the lens elements can slide in the direction shown by arrow 5.

Japanese laid open patent application JP 8122604-A discloses a lens tray for horizontally supporting lens elements of different diameters. This lens tray includes "a set of loading holes having circular conic shape smoothly reducing in diameter in depth direction." Because this conic shape provide gradual reduction in diameter, it can accommodate lens elements of different diameters. However, because there is no radial constraint on the location of a lens element within a hole, a lens element can move within this hole. Thus, the disclosed lens tray can not be used during a mechanized assembly that requires the exact knowledge of lens center coordinates.

U.S. Pat. No. 4,084,700 discloses a display rack for displaying lens elements. The disclosed rack has a body panel with a plurality of tabs for vertically supporting the lens elements. However, the disclosed display rack is not suitable for holding lens elements during a surface coating operation, such as vapor deposition, because the lens elements are held vertically and because the tabs cover parts of lens element's front surfaces. In addition, the solid wall of the body panel does not provide an access to the rear surfaces of the lens elements. Thus, if the rear lens surfaces need to be coated, the lens elements will need to be taken out of the display rack and flipped around. Finally, the lens elements are not in the right orientation for their assembly within a lens barrel, if such assembly is required. Because the lens elements are supported vertically on the body panel, rather than horizontally, they would have to be rotated (by about 90 degrees) prior to their placement within a vertical lens barrel.

U.S. Pat. Nos. 4,796,756, 3,889,815 and 5,584,400 also disclose optical lens trays. The disclosed trays also cannot be used to support lens elements during a coating operation because the lens elements are located behind one another and thus block one another. In addition, the lens elements are not in the right orientation for their assembly within a lens barrel, if such assembly is required. Because the lens elements are stacked vertically within the lens tray, rather than horizontally, they would have to be rotated (preferably by 90 degrees) prior to their placement within a lens barrel.

Finally, many different polymer materials exist. Their outgassing characteristics are known. For example, in the NASA publication SP-105 entitled "Vacuum Technology and Space Simulation", pg. 219 discloses the table of outgassing values for different materials. It is noted that if the outgassing measurement test was performed under different conditions the outgassing values can change, but the relative position of the materials on the list would remain the same.

SUMMARY OF THE INVENTION

An object of the present invention is to provide a lens tray for storage and transportation of lens elements that is also suitable for holding lens elements during the coating and automatic lens element assembly operations.

It is also an object of the present invention to provide a method for quick and inexpensive processing of lens elements.

According to one aspect of the invention, a lens tray includes a support panel having an array of sockets. Each of the sockets has a first wall defining a first opening and a second wall defining a second opening, a retaining wall adjacent to the first wall and a flange having a first surface forming a lens seat. The first surface is located adjacent to the retaining wall. At least one of the openings has an inner aperture and an outer aperture. The outer aperture is greater in size than the inner aperture.

According to a preferred embodiment, this opening is a conical opening.

According to a preferred embodiment, the other opening also has an inner aperture and an outer aperture. The outer aperture of this other opening is greater in size than the inner aperture.

Also, according to a preferred embodiment, the retaining wall is cylindrical.

According to another aspect of the invention, a lens tray includes a flat panel of a predetermined thickness with a plurality of sockets. The sockets have mutually parallel, axially cylindrical holes. The sockets also have an outwardly tapering conical opening at a first end of a respective one of the plurality of holes, and a radially inwardly extending flange at the other second end of the respective one of said plurality of holes.

According to a preferred embodiment of the present invention, the panel is made of 20% chopped glass-filled polycarbonate.

According to a preferred embodiment, an assemblage of lens trays comprises a plurality of lens trays described above, wherein each of said lens trays has at least two pins and at least two recesses; and the pins of any one but one of the plurality of trays engage the recesses of another one of the plurality of lens trays.

According to another aspect of the invention, a method of processing lens elements comprises the steps of:

(1) placing a plurality of molded lens elements into a lens tray;
(2) placing the lens tray with the lens elements into a coating chamber;
(3) coating the lens elements and the lens tray with a coating material; thereby providing coated lens elements and a coated lens tray; and
(4) transporting the coated lens elements in the said coated lens tray to a lens assembly area;
(5) removing said coated lens elements from said coated lens tray by a robotic arm; and
(6) assembling the lens elements into a lens system.

BRIEF DESCRIPTION OF THE DRAWINGS

The forgoing and other objects, features and advantages of the invention will be apparent from the following more particular description of the preferred embodiments of the invention as illustrated in the accompanying drawing.

DETAILED DESCRIPTION OF THE INVENTION

The following is a detailed description of the preferred embodiments of the invention, reference being made to the drawings in which the same reference numerals identify the same elements of structure in each of the several Figures.

Figure 2:
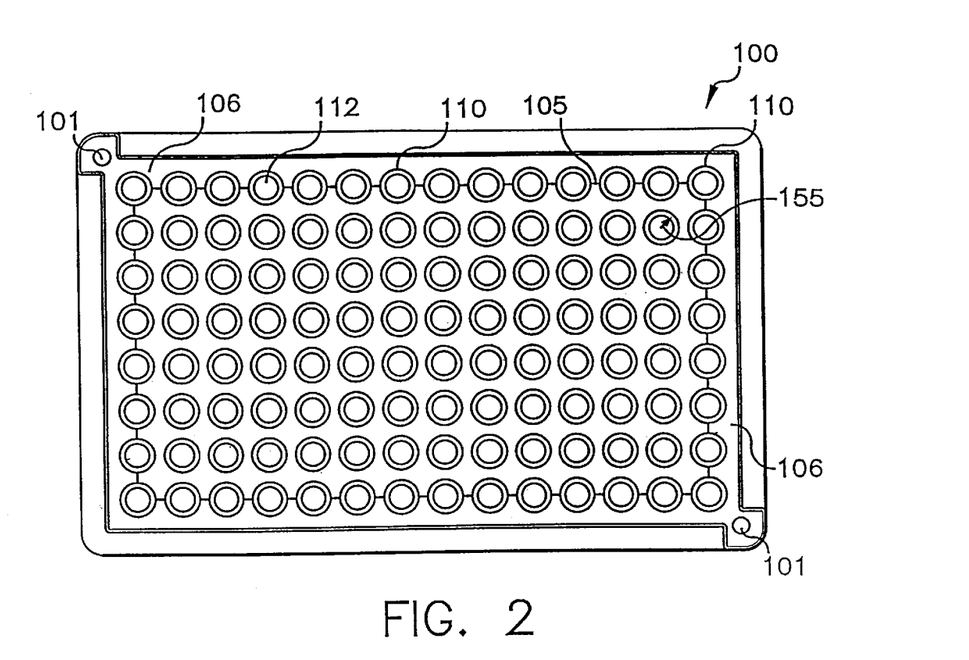
FIG. 2 shows a top view of a lens tray.

FIG. 2 illustrates a lens tray 100. This tray comprises a panel with a plurality of sockets 110 arranged in an m by n (m×n) array in an equally spaced relationship. The panel 105 may be made out of metal with the sockets 110 machined in it. However, if a large quantity of lens trays 100 needs to be made, it may be preferred that the lens trays 100 be molded (for example, injection molded or vacuum formed) out of a polymer. It is preferred the matrix polymer or polymers used have a high molecular weight (i.e. a molecular weight that is greater than 100,000 daltons). Fillers and other additives can be used, but it is also highly preferred that the polymer used have a low rate of outgassing when used in a vacuum chamber. For this reason it is preferred that the polymer used be free from deleterious fillers or other contaminants.

According to a preferred embodiment of the present invention the polymer used is 20% chopped glass-filled polycarbonate. It has a low outgassing rate, as disclosed in Table 1. It is preferred that an outgassing rate of the lens tray material be no more than about four (4) times the rate of the polymer used in this embodiment. It is even more preferred that the outgassing rate be less than $4 \times 10^{-7}$, Torr -liters/sec-$cm^2$ and more preferably be between 0.0 and $2 \times 10^{-7}$ of Torr-liters/sec-$cm^2$ (after 1 hour of pump time), because it directly affects the outcome of pump cycle time and pump capacity. Materials with high outgas characteristics may prove detrimental to lens systems over a distinct period of time, because polymer by-products may adhere onto lens element's surfaces, interfering with optical quality.

Table 1 discloses outgassing rates of some of the materials. Some of these materials have a very high outgassing rate while some of the materials have a low outgassing rate.

TABLE 1

Outgassing Rate (after 1 hour of pump time)
(Torr liters/cm$^2$ sec) × 10$^7$

| Material | |
|---|---|
| General: Sand-blasted metal | 5.0 |
| As Received Rolled Steel | 1.5 |
| Cleaned/Degreased Steel | 0.15 |
| Plexiglass (Lucite) | 19. |
| Polyamide (Nylon) | 26. |
| Poycarbonate (Lexan) | 7.2 |
| Polyethylene | 2.3 |
| Kel-F | 0.4 |
| Teflon | 2. |
| Polyester | 25. |
| Silicone Rubber | 70. |
| PTMT-6G91 | 1. |
| Polysulfone | 7.8 |
| 20% chopped glass-filled polycarbonate | 1.2 |

It is noted that under different measurement conditions the values of outgassing rates may change, but the relative position of materials in the table would be expected to remain the same. The outgassing properties of polymers can be determined empirically by (1) looking to see if lens surfaces are coated by a thin layer of polymer material, or (2) by comparing it with lens surfaces of the lens elements coated in the lens tray made of 20% chopped glass-filled polycarbonate, and by seeing if the optical quality of tested, coated lens elements is impaired when compared to lens elements coated in the lens tray made of 20% chopped-glass filled polycarbonate.

Care should be taken that the material used has the appropriate flow rate to prevent undue stresses in the lens tray, which manifest during cooling of the freshly molded lens tray, because such temperature induced stresses are likely to cause deformation or weakness in the lens tray 100. It is preferred that the perimeter 106 of the panel 105 be reinforced to make the lens tray more rigid. (FIG. 2) This is needed to prevent the lens tray from warping and buckling. A simple way to reinforce the perimeter is to make it thicker than the rest of the panel.

Figure 3A:
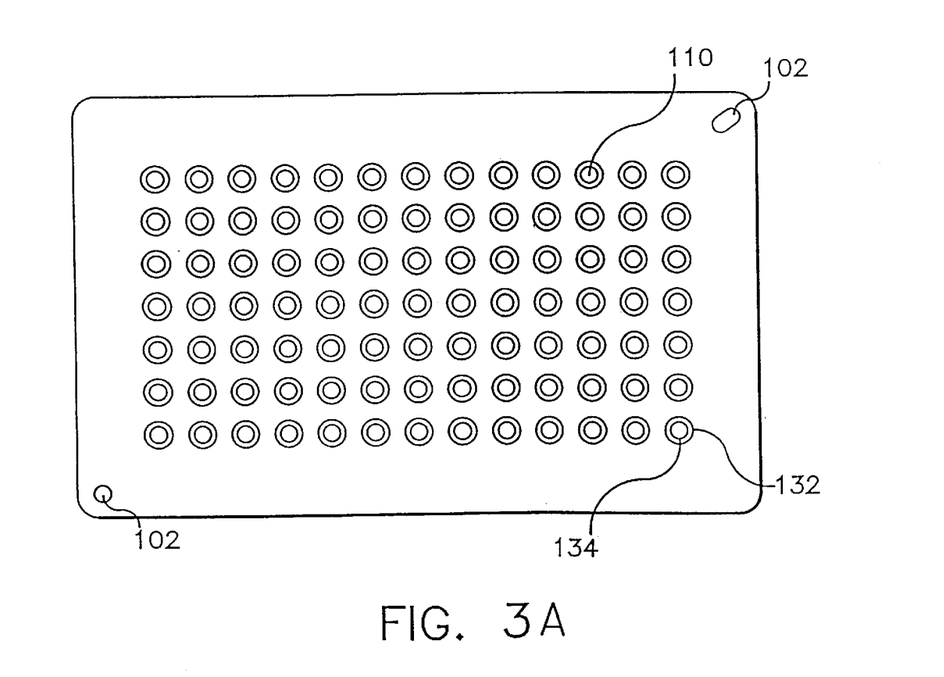
FIG. 3A shows a bottom view of a lens tray.
Figure 3B:
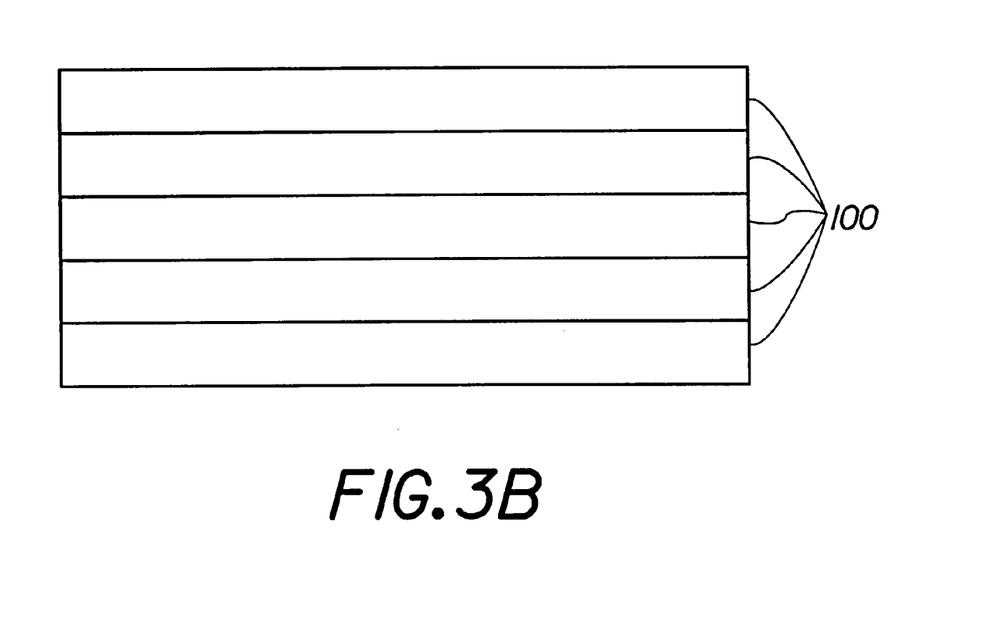
FIG. 3B shows a lens tray assemblage of a plurality of lens trays.
Figure 4:
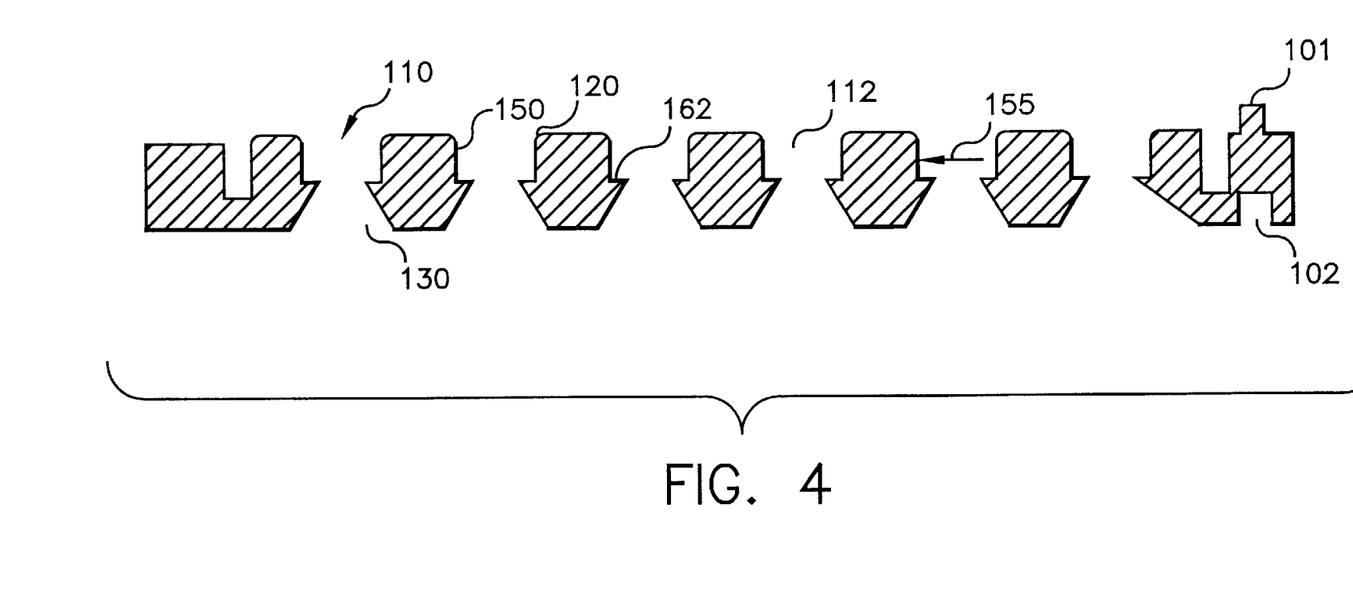
FIG. 4 provides a crossectional side view of the lens tray of FIGS. 2 and 3.

Each lens tray 100 also includes two pins 101 and two pin sockets 102. These pin sockets 102 are illustrated in FIG. 3. FIG. 4 provides a crossectional view of the lens tray 100 including pins 101 and pin sockets 102. Multiple lens trays 100 can be stacked together into a lens tray assemblage for efficient storage of lens elements. In order to stack the lens trays properly, the pins 101 of one lens tray must engage the pin sockets 102 of another lens tray.

Figure 5:
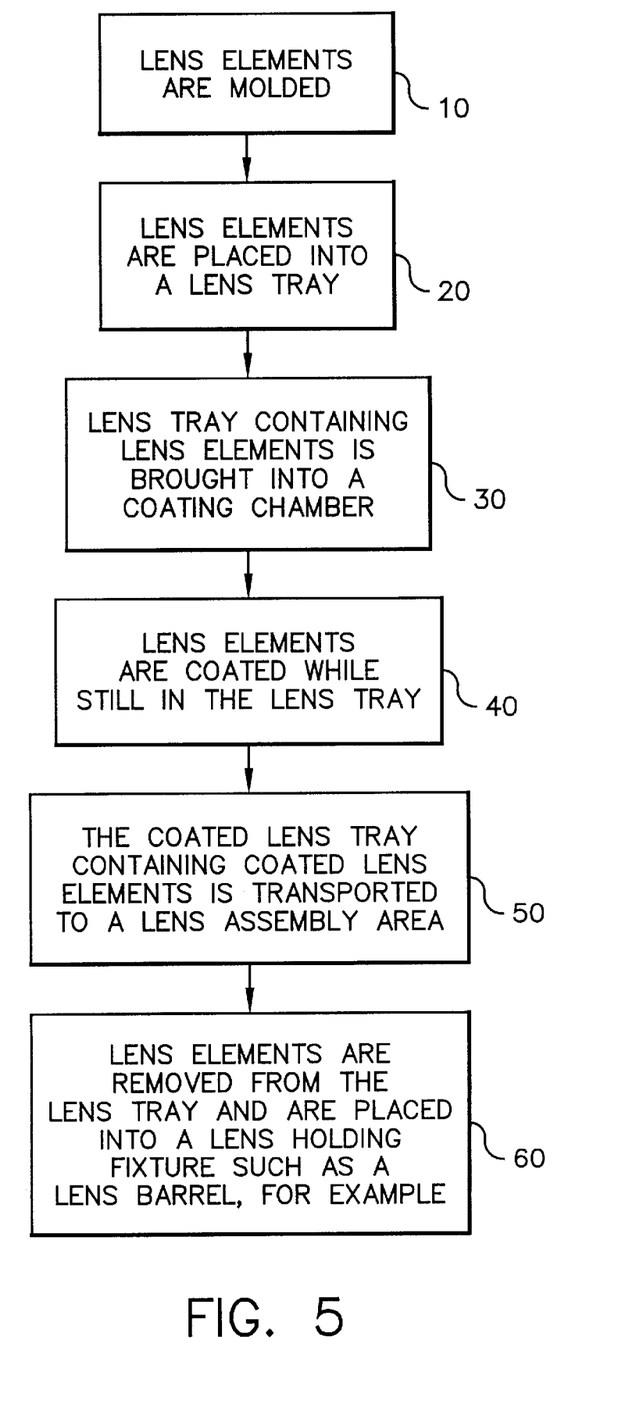
FIG. 5 illustrates a method of processing lens elements.
Figure 6A:
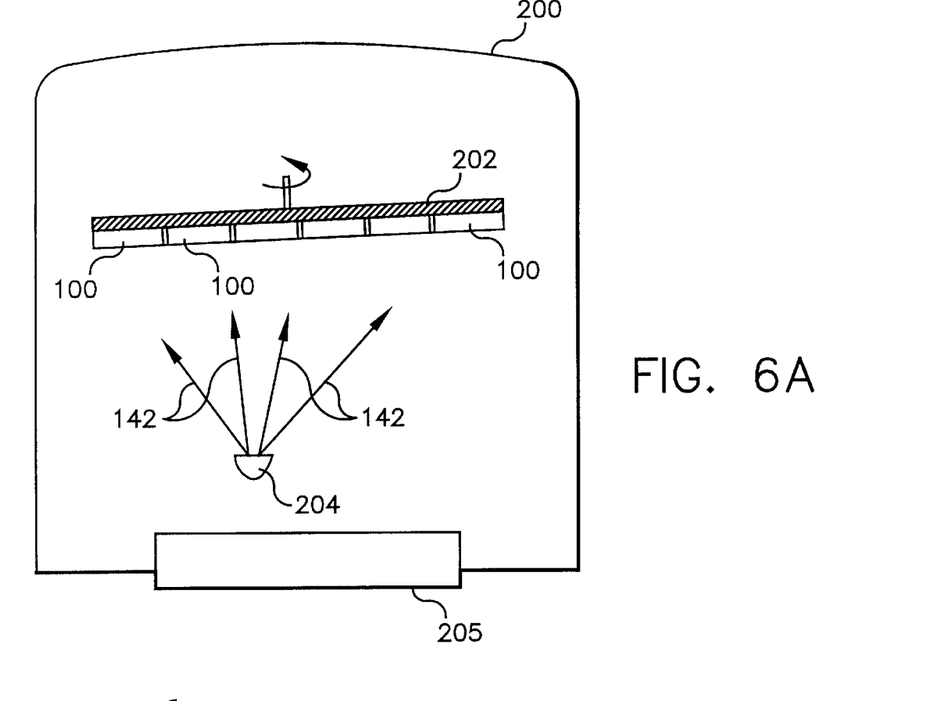
FIG. 6A is a schematic drawing of a coating chamber.
Figure 6B:
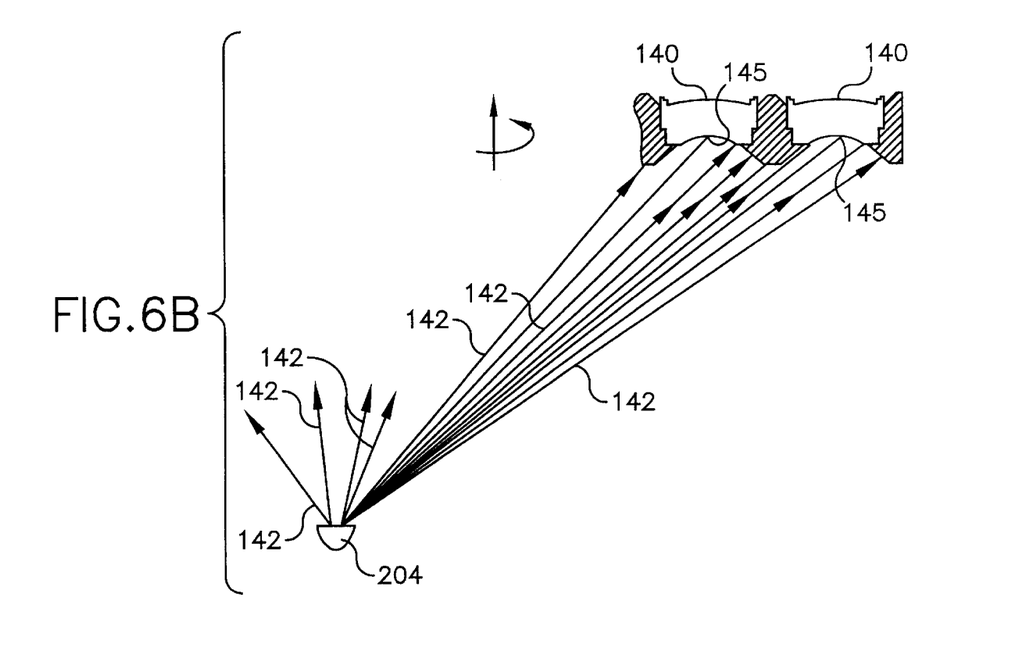
FIG. 6B illustrates an exemplary path of the coating material impinging on lens element's surfaces.
Figure 6C:
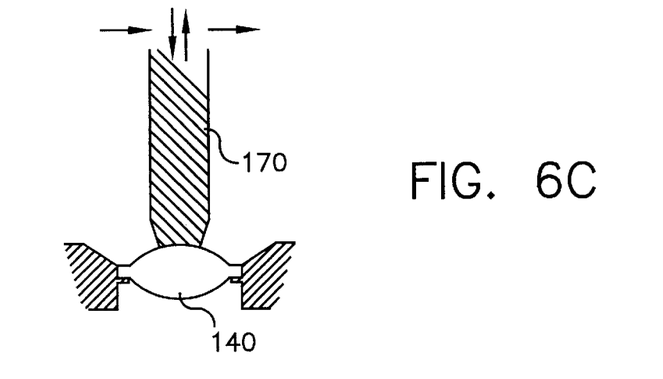
FIG. 6C is a schematic illustration of a lens element removal from a lens socket by a robotic arm.

As stated above, each lens tray comprises a flat panel 105 with a plurality of sockets 110. The sockets 110 are configured to provide a coating material with a good access to a lens surface during the coating operation and to prevent a lens element from shifting its position on the lens tray. (The socket configuration is discussed below). Therefore, the lens tray of the present invention is suitable for holding lens elements during the coating and mechanized assembly operation as well as during transportation and storage. FIG. 5 illustrates the preferred method of processing lens elements. This method includes steps (10) through (60) which are described below. More specifically, once the lens elements 140 are molded (step 10), they are placed into the lens tray 100 (step 20). The lens trays 100 are then brought into a coating chamber (step 30) and are placed on (or attached to) a rotating lens tray table 202 located inside the coating chamber 200. This is illustrated in FIG. 6A. A coating material (such as MgF$_2$ or a metallic coating, for example) is placed into a dish 204 that is also located in the coating chamber 200. The coating chamber 200 is supplied with one or more vacuum pumps 205 that suction out the impurities. When the desired amount of vacuum is created, the vacuum suction is stopped and, according to a preferred embodiment, the coating material 142 is either evaporated or is spattered on the optical surfaces of the lens elements 140 while the lens tray table rotates. This is illustrated in FIG. 6B. The rotation of the tray table averages out the amount of the coating material 142 received by each lens element 140 during the coating operation. During the coating operation (step 40), the lens tray 100 will be also covered by the coating material 142. (FIG. 6B) After the coating operation is completed, the coated lens trays 100 and the lens elements 140 contained therein are transported to the automatic lens system assembly area (step 50). Lens elements are then removed from the lens tray and are placed into a lens holding fixture such as a lens barrel or a lens mount, for example (step 60). More specifically, according to the preferred embodiment each lens element 140 is held in a precise, predetermined location on the lens tray 100 by the retaining walls 150 of the socket 110. A robotic arm 170 (of an automatic assembly apparatus) picks up the lens element 140 from the lens tray 100 and places it into a lens holding fixture such as a lens barrel. (FIG. 6C) When the lens tray becomes empty, it can be reused with other (similarly sized) lens elements.

Figure 7:
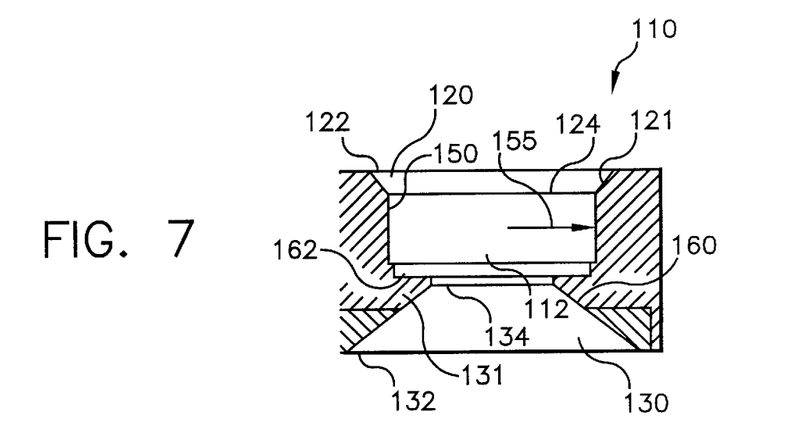
FIG. 7 provides a crossectional view of a socket of a lens tray of FIG. 2.
Figure 8:
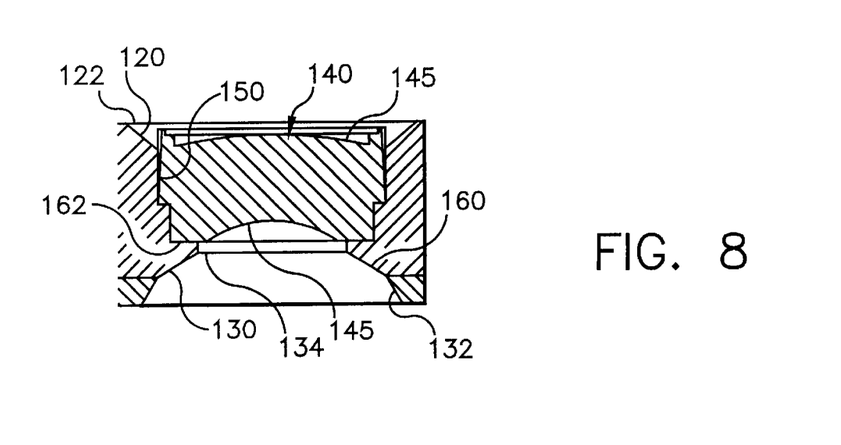
FIG. 8 provides a crossectional view of a socket of a lens tray of FIG. 2 and a lens element located in the socket.
Figures 9, 10:
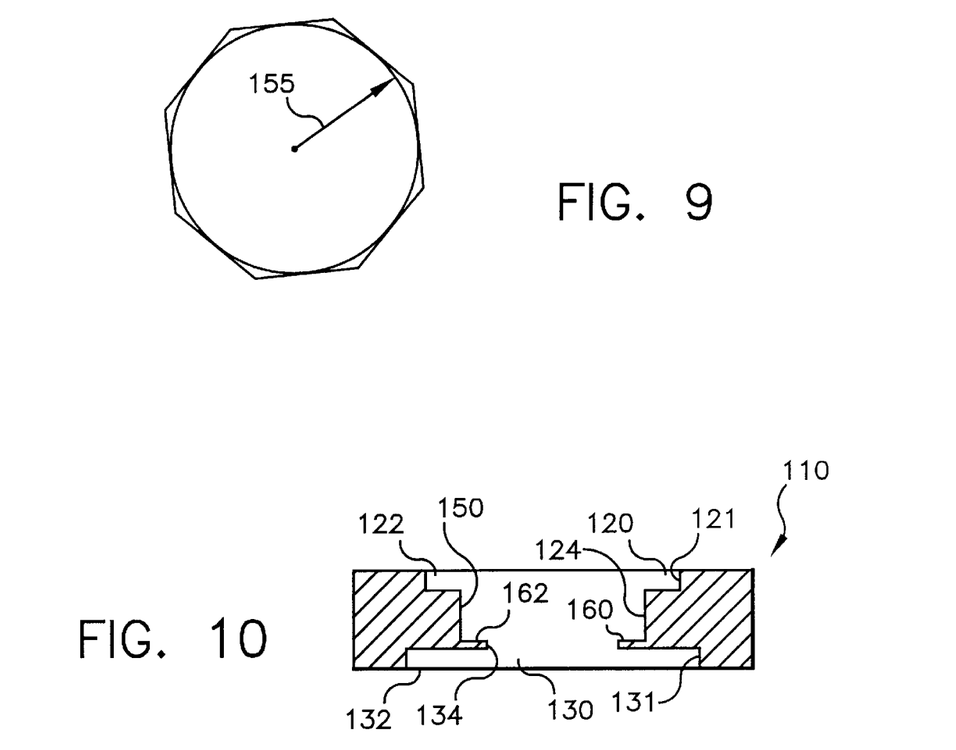
FIG. 9 provides a crossectional view of the retaining walls with a polygonal crossection.
FIG. 10 provides a crossectional view of another socket of a lens tray of FIG. 2.

A first embodiment of the socket 110 is illustrated in FIGS. 7 and 8. FIG. 7 shows the socket 110 without a lens element, while FIG. 8 shows the socket 110 with the lens element 140 in it. As seen from these figures (and the previously referred to FIGS. 2, 3 and 4) the flat panel 105 has a plurality of sockets 110 with a mutually parallel axially cylindrical holes 112 defined by a radius 155. Each of the sockets 110 has an outwardly tapered conical opening at a first end of the hole and a radially inwardly extending flange at the second end of the hole. More specifically, each socket 110 has a first opening 120 and a second opening 130 defined by the outwardly tapered conical walls 121 and 131, respectfully. The first opening 120 is provided to allow a lens element 140 to access the socket. Each socket 110 of this embodiment has a retaining wall 150 adjacent to the wall 121 and a radially inwardly extending flange 160 having a first surface 162 forming a lens seat. The first surface 162 is located adjacent to the retaining wall 150. In this embodiment, the first surface 162 is perpendicular to the retaining wall 150. The retaining walls 150 define the plurality of axially symmetrical holes 112. It is preferred that the retaining wall be cylindrical because most lens elements have cylindrical outer surfaces and because it is relatively easy to make a mold with cylindrical nubbins. However, other retaining wall configurations could also be used as long as the lens element is held in a precise location. For example, a retaining wall having a polygonal crossection with an inscribed radius 155 as shown in FIG. 9 may also be used.

It is preferred that the radius 155 of the retaining cylindrical wall 150 be made to the tight tolerances in order to constraint the lens element 140 from moving sideways. This is important in automatic lens element assembly that requires the exact knowledge of lens center coordinates. More specifically, for automatic lens element assembly it is preferred that the retaining walls of the sockets are to be made substantially the same and have radii 155 that differ from one another by no more than ±0.0055 inches. It is even more preferred that the radii 155 differ by no more than ±0.003 inches.

As stated above, the openings 120, 130 of the first embodiment are defined by the conical outwardly tapered walls 121, 131, an outer aperture 122, 132 and an inner aperture 124, 134. Because the conical openings are defined by the outwardly tapered conical walls, the outer apertures 122, 132 of the conical openings 120, 130 are larger than the inner apertures 124, 134. The outwardly tapered conical shape of the openings 120, 130 allows the coating material 142 (vaporized onto an optical surface 145 of the lens element) to be applied uniformly. If the walls 121, 131 defining the opening 120, 130 are not tapered to provide a larger outer aperture 122, 132, the coating material 142 will not be uniformly deposited onto the optical surface 145. It is preferred that the slope angle of the conical walls 121, 131 be between 30 and 60 degrees and it is even more preferred for it to be about 45 (±5) degrees. If the lens element 140 requires only one of its optical surfaces to be coated, the socket may have only one outwardly tapered conical opening (not shown). If both optical surfaces are to be coated, the socket may have two outwardly tapered conical openings.

The outwardly tapered shape of the conical wall 121 is used as a guide feature for automatic placement of the lens elements into a socket. This placement step is described as step 20 of FIG. 5. In addition, the outwardly tapered shape of the conical wall 121 provides a robotic arm (of the automatic lens assembly apparatus) with a large area to come down to during a lens elements pick up. It also allows the robotic arm to smoothly glide towards the lens element 140 during an assembly operation. Finally, it also makes the lens tray 100 more rigid.

Figure 11:
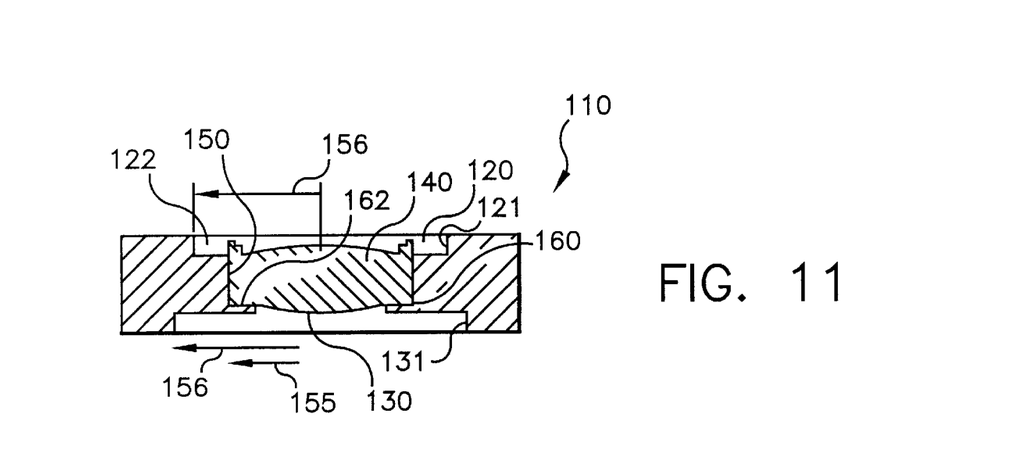
FIG. 11 provides a crossectional view of a socket of FIG. 5 and a lens element located in this socket.

A second embodiment of the socket 110 is illustrated in FIGS. 10 and 11. FIG. 5 shows the socket 110 without a lens element, while FIG. 6 shows the socket 110 with a lens element 140 in it. As seen from these figures, this socket also has a first opening 120 and a second opening 130. The walls 121, 131 forming these openings 120, 130, are cylindrical and have a larger radius of curvature (156) than that of the cylindrical retaining walls 150.

The first opening 120 is provided to allow the lens element 140 to access the socket. As in the first embodiment, each socket 110 has a retaining cylindrical wall 150 adjacent to the first opening and a flange 160 having a first surface 162 forming a lens seat. The first surface 162 is adjacent to and is perpendicular to the retaining cylindrical wall 150. The openings 120, 130 have an inner aperture 124, 134 and an outer aperture 122, 132. As in the previous embodiment, the outer apertures are greater in size than the inner apertures. The larger outer apertures 122, 132 allow a coating material 142 (vaporized onto an optical surface 145 of the lens element 140) to be applied relatively uniformly. If an opening does not have a larger outer aperture, the coating material 142 will not be uniformly deposited onto the optical surface 145. If the lens element 140 requires only one of its optical surfaces to be coated, the socket may have only one opening with a larger outer aperture (not shown). If both optical surfaces of the lens element 140 are to be coated, the socket may have two openings with a larger outer aperture.

The invention has been described in detail with particular reference to certain preferred embodiments thereof, but it will be understood that variations and modifications can be effected within the spirit and scope of the invention. For example, the retaining wall may be other than cylindrical in shape. Also, for example, the first and second openings do not have to be cylindrical or conical in shape, as long as the inner apertures are smaller than the outer apertures.

| PARTS LIST | |
|---|---|
| 100 | Lens tray |
| 101 | Pins |
| 102 | Pin sockets |
| 105 | Panel |
| 106 | Perimeter |
| 110 | Sockets |
| 112 | Cylindrical holes |
| 120 | First opening |
| 121, 131 | Walls |
| 122, 132 | Outer aperture |
| 124, 134 | Inner aperture |
| 130 | Second opening |
| 140 | Lens elements |
| 142 | Coating material |
| 145 | Optical surface |
| 150 | Retaining wall |
| 155 | Radius |
| 160 | Flange |
| 162 | First surface |
| 170 | Robotic arm |

What is claimed is:

1. A lens tray comprising:
   a flat support panel having an array of sockets, each of said sockets having
   a first wall defining a first opening and a second wall defining a second opening wherein at least one of said openings has an inner aperture and an outer aperture, said outer aperture being greater in size than said inner aperture;
   a retaining wall adjacent to said first wall and located between said first and second wall; and
   a flange having a first surface forming a lens seat, said first surface being adjacent to said retaining wall, wherein said retaining walls of said sockets are cylindrical and have substantially the same radii, such that said radii differ by no more than ±0.0055 inches.

2. A lens tray according to claim 1 wherein the retaining walls have radii that differ by no more than ±0.003 inches.

3. A lens tray according to claim 1 wherein said support panel is made of low outgassing material having an outgassing rate less than or equal to 0.0 to $4 \times 10^{-7}$ Torr-liters/sec-$cm^2$ when measured after 1 hour of pumping time.

4. A lens tray according to claim 3 wherein said outgassing rate is less than or equal to $2 \times 10^{-7}$ Torr-liter/sec-$cm^2$ lens tray after 1 hour of pumping time.

5. A lens tray according to claim 1 wherein said support panel is made of 20% chopped glass-filled polycarbonate.

6. A lens tray comprising:
   a flat support panel having an array of socket, each of said sockets having
   a first wall defining a first opening and a second wall defining a second opening at least one of said opening having an inner aperture and an outer aperture, wherein said outer aperture is greater in size than said inner aperture:
   a retaining wall adjacent to said first wall:
   a flange having a first surface forming a lens seat, said first surface being adjacent to said retaining wall; and
   wherein each of said retaining walls of said sockets has a cross section of a polygon, said polygon having an inscribed radius of curvature, and said retaining walls of said sockets have inscribed radii of curvature that differ by no more than ±0.0055 inches.

7. A lens tray according to claim 6 wherein said radii of curvature differ by no more than ±0.003 inches.

8. A lens tray comprising:
   a flat support panel having an array of sockets, each of said sockets having
   a first wall defining a first opening and a second wall defining a second opening, each one of said openings of each of said sockets also has an outer aperture and an inner aperture and said outer aperture of said each one of said openings is greater in diameter than said inner aperture of said each one of said openings;
   a retaining wall adjacent to said first wall; and
   a flange having a first surface forming a lens seat, said first surface being adjacent to said retaining wall.

9. A lens tray according to claim 8 wherein each retaining wall is cylindrical.

10. A lens tray according to claim 8 wherein each of said retaining walls is cylindrical and said retaining walls are made to have substantially the same radii and said radii differ by no more than 0.0055 inches.

11. A lens tray according to claim 10 wherein said radii differ by no more than ±0.003 inches.

12. A lens tray according to claim 8 wherein each of said retaining walls of said sockets has a cross section of a polygon, said polygon having an inscribed radius of curvature, and wherein said retaining walls of said sockets are made to have substantially the same inscribed radii of curvature that differ by no more than ±0.0055 inches.

13. A lens tray according to claim 8 wherein said retaining walls have radii of curvature that differ by no more than ±0.003 inches.

14. A lens tray comprising:
   a flat panel of predetermined thickness with a plurality of sockets having mutually parallel axially cylindrical holes, each of said sockets having
   (i) an outwardly tapering conical opening at a first end of a respective one of said plurality of holes; and
   (ii) a radially inwardly extending flange at the other second end of the respective one of said plurality of holes.

15. A lens tray assemblage comprising:
   a plurality of lens trays, each of said lens trays including:
   a flat support panel having an array of sockets, each of said sockets having (i) a first wall defining a first opening and a second wall defining a second opening, both of said openings having an inner aperture and an outer aperture, said outer aperture being greater in size than said inner aperture, (ii) a retaining wall adjacent to said first wall, (iii) a flange having a first surface forming a lens seat, said first surface being adjacent to said retaining wall;
   wherein each of said lens trays has at least two pins and at least two recesses; and
   wherein said pins of any one but one of said plurality of trays engage the recesses of another one of said plurality of lens trays.

16. A lens combination comprising:
   (i) a flat support panel having an array of sockets, each of said sockets having
   a first wall defining a first opening and a second wall defining a second opening, at least one of said openings having an inner aperture and an outer aperture, wherein said outer aperture is greater in size than said inner aperture;
   a retaining wall adjacent to said first wall;
   a flange having a first surface forming a lens seat, said first surface being adjacent to said retaining wall; and
   (ii) a plurality of lens elements disposed in said sockets and retained by said retaining walls from substantial movement.

* * * * *